(12) United States Patent
Hill, Sr.

(10) Patent No.: US 6,651,940 B2
(45) Date of Patent: Nov. 25, 2003

(54) TRACTOR-TRAILER SUPPORT APPARATUS

(76) Inventor: Gene R. Hill, Sr., 4219 Worthy Dr., Lake Charles, LA (US) 70607

( * ) Notice: Subject to any disclaimer, the term of this patent is extended or adjusted under 35 U.S.C. 154(b) by 84 days.

(21) Appl. No.: 09/924,188

(22) Filed: Aug. 8, 2001

(65) Prior Publication Data

US 2003/0029971 A1 Feb. 13, 2003

(51) Int. Cl.[7] .......................... A47G 29/00; B05B 15/06
(52) U.S. Cl. ........................ 248/80; 248/75; 280/420
(58) Field of Search ............................. 248/81, 80, 75, 248/125.7, 125.9, 105, 89.11, 289.11, 521, 51, 106, 442.2, 82, 283.1, 296.1, 49; 473/429; 396/1; 280/420, 421, 422; 137/899.1, 355.17

(56) References Cited

U.S. PATENT DOCUMENTS

| | | | | |
|---|---|---|---|---|
| 2,963,247 A | * | 12/1960 | Collier | |
| 3,077,613 A | * | 2/1963 | Mayer | |
| 3,918,746 A | * | 11/1975 | Lehtisaari | 280/477 |
| 4,034,945 A | * | 7/1977 | Sato | 248/103 |
| 4,790,500 A | * | 12/1988 | Mori | 248/49 |
| 5,540,430 A | * | 7/1996 | Nichols et al. | 273/26 E |
| 6,102,344 A | * | 8/2000 | Kasvin | 248/118 |

* cited by examiner

Primary Examiner—Gwendolyn Baxter
(74) Attorney, Agent, or Firm—Bill B Berryhill

(57) ABSTRACT

Apparatus for supporting cable, hose and the like between a tractor and trailer of a tractor-trailer rig. The apparatus includes a base member attached to the frame of the tractor and a tubular sleeve member extending vertically therefrom. A support member has a portion insertable into the sleeve member for rotation therein and from an upper end of which extends, at an angle therewith, an arm portion. An attachment member is connected to the distal end of the arm member for attachment to cable, hose and the like.

7 Claims, 1 Drawing Sheet

TRACTOR-TRAILER SUPPORT APPARATUS

BACKGROUND OF THE INVENTION

1. Field of the Invention

The present invention pertains to tractor-trailer apparatus. More specifically, the present invention pertains to apparatus for supporting cable, hose and the like which provide power and/or fluid communication between a tractor and trailer of a tractor-trailer rig.

2. Description of the Prior Art

Tractor-trailer rigs are made up of a self-propelled tractor vehicle to which a trailer is attached. Many such tractors are provided with what is referred to as a "fifth wheel" which is engageable by a cylindrical member depending from the lower front end of a trailer to provide a pivoting connection between the tractor and the trailer. The tractor which is driven by an engine typically provides electrical power, air and/or hydraulic fluids for operation of various components of the tractor and the trailer. For this reason, electrical cable, hydraulic fluid hose, air hose, etc. are normally required to provide electrical power and/or fluid communication between the tractor and the trailer. The cable, hose and the like normally extend from the back of the tractor cab to the leading end of the trailer.

Since the connection between a tractor and trailer is a pivoted connection, there is continual relative pivotal movement between the tractor and trailer. This causes continual flexing of cable, hose and the like and may cause the cable, hose and the like to be moved about in such a way that it rubs against the tractor, the fifth wheel or the trailer. In addition, unsupported hoses and cable lying on tractor or trailer frames may be chaffed from highway vibration while the rig is in operation. Such rubbing or chaffing may wear and/or damage the cable, hose and the like. If it is an electrical cable, electrical power may be interrupted or be hazardous if near a combustible environment. Damaged hydraulic or air hoses may result in loss of fluid and, more importantly, failure of brakes and operation of other portions of the rig.

Even if there is no loss or interruption of electrical power or fluid communication between a tractor and trailer, wearing of the cable hoses and the like may result in frequent replacement of these components. This involves substantial maintenance expenses and may result in the tractor-trailer rig being kept out of service while repairs and/or replacements are made.

A number of devices have been developed in the prior art in attempts to solve these sorts of problems. Examples of such are those shown in U.S. Pat. Nos. 2,619,888; 2,932,475; 2,948,450; 4,002,357; 5,713,592; and 5,909,861. These devices vary in cost and complexity. The fact that there are continued developments in this area indicates a continuing search for new and improved solutions to these problems.

SUMMARY OF THE PRESENT INVENTION

The apparatus of the present invention has been developed to support cable, hose and the like, which provide power and/or fluid communication between a tractor and trailer of a tractor-trailer rig. The apparatus includes a base member which is attachable to the frame or chassis of the tractor. A tubular sleeve member is affixed to the base member and extends vertically upward therefrom. A support member has an elongated cylindrical portion insertable into the sleeve member for rotation therein. Extending from the cylindrical portion of the support member at an angle therewith is an arm portion which pivots about the axis of the cylindrical portion as it rotates within the sleeve member. An attachment member is connected to the distal end of the arm member for attachment to the cable, hose or the like which provide power and/or fluid communication between the tractor and trailer. The cable, hose or the like are therefore supported at the distal end of the arm member allowing the cable, hose or the like to move as the trailer and tractor pivot relative to each other, keeping the cable, hose, etc. supported in a manner to prevent chaffing, rubbing or other damage thereto.

The support apparatus of the present invention is easy to install, connect and operate. It is relatively simple in construction. Most importantly, it prevents damage to cable, hose, etc. and reduces maintenance cost and prevents shut down of the tractor-trailer rig. Other objects and advantages of the invention will be seen upon reading of the specification in conjunction with the accompanying drawings.

DESCRIPTION OF A PREFERRED EMBODIMENT OF THE INVENTION

Figure 1:
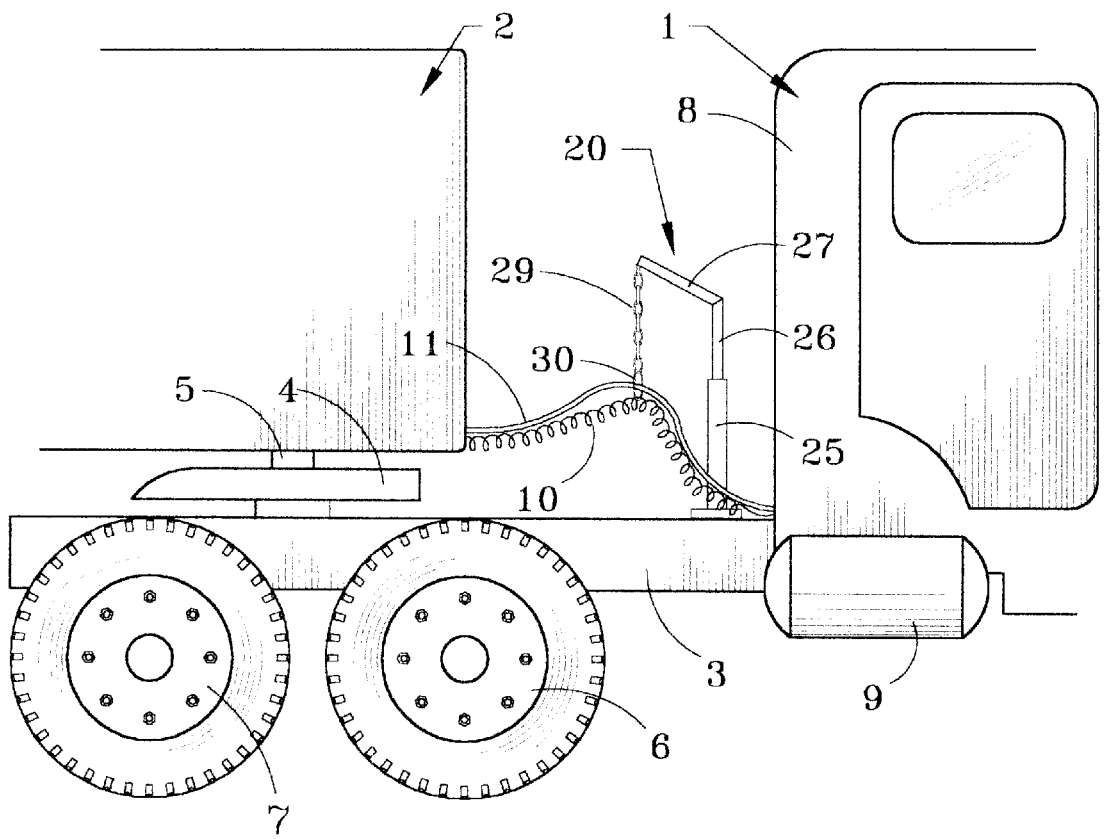
FIG. 1 is a pictorial representation of a portion of a tractor-trailer rig utilizing apparatus of the present invention to support cable, hose and the like which provide power and/or fluid communication between the tractor and trailer, according to a preferred embodiment of the invention.

Referring first to FIG. 1, there is shown portions of a tractor 1 and trailer 2 of a tractor-trailer rig. Supported on the frame or chassis 3 of the tractor 1 is a device 4 sometimes referred to as the "fifth wheel" which is engageable by a downwardly depending cylindrical member 5 at the forward end of trailer 2 to provide an articulated or pivoted connection between the tractor 1 and trailer 2. The tractor 1 is supported on a plurality of axle and wheel assemblies only two such assemblies 6, 7 being shown in the drawing. Other axle and wheel assemblies support the front end of the tractor 1 and the rear end of the trailer 2. The tractor 1 is provided with a cab portion 8 and an engine (not shown) which may drive electrical generators, hydraulic pumps, air compressors, etc. for operation of the tractor 1 and the trailer 2. One or more cables 10 and one or more hoses 11 and the like may provide power and/or fluid communication between the tractor and trailer for operation of lights, air conditioning units, brakes, and other items. When the trailer 2 is not in use, i.e. not connected to the tractor 1, these cables 10 and hoses 11 are disconnected at the trailer end and simply suspended by support apparatus 20. When the trailer is connected and in place as in FIG. 1, the connecting devices at the ends of the cables 10 and hoses 11 are engaged with mating connecting devices on the trailer 2 and the cables 10 and hoses 11 are suspended from the support apparatus 20.

Figure 2:
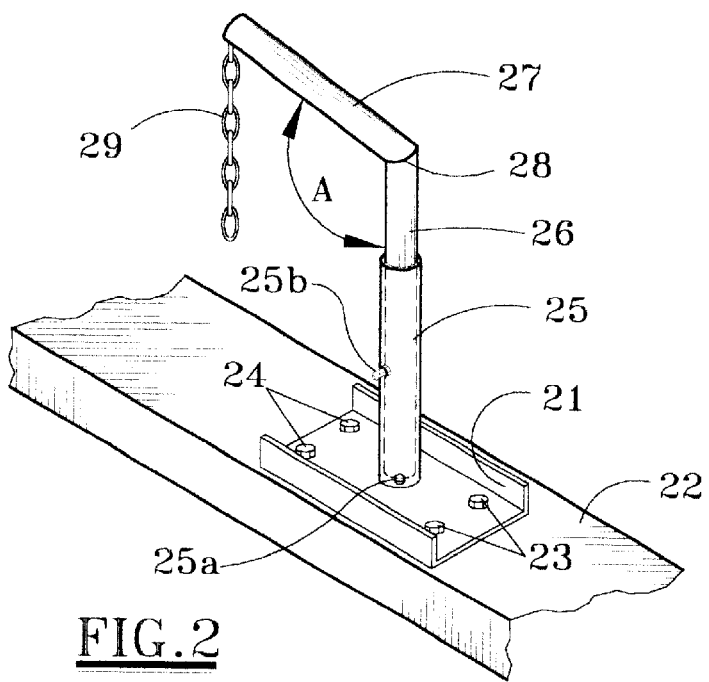
FIG. 2 is an isometric drawing of the support apparatus of the present invention, according to a preferred embodiment thereof, showing the apparatus attached to the frame or chassis of a truck.

Referring now also to FIG. 2, the support apparatus 20 of the present invention comprises a base member 21 attachable to a portion of the frame or chassis 3 of the truck 1. In FIG. 2 this is indicated as a cross support member 22 of the truck frame. The base member 21 may be conveniently formed from a short piece of channel steel and may be attached to the truck frame cross support 22 by bolts 23, 24, etc. In the alternative it may be welded to the support member 22.

Affixed to the base member 21 and extending vertically upward therefrom is a tubular sleeve 25. The lower end of the sleeve 25 may be affixed to the base member 21 by welding or any other suitable manner. A small drain hole 25a may be drilled near the lower end of sleeve 25 to prevent water from collecting therein.

An elongated cylindrical portion 26 of a support member is insertable into the sleeve member 25 for rotation therein. Extending from the upper end of the cylindrical portion 26, at an angle A therewith, is an arm portion 27 which pivots about the axis of the cylindrical portion 26 as it rotates within the sleeve member 25. A grease fitting 25b may be placed in the sleeve member 25 to provide lubrication between the sleeve 25 and the cylindrical portion 26 of the support member.

Although dimensions are not critical, an exemplary embodiment of the support apparatus might utilize a two foot long piece of two inch pipe for the sleeve 25. The cylindrical portion 26 of the support member could be formed from a three foot long piece of one and a half inch pipe. Thus the smaller diameter cylindrical portion 26 easily rotates within the larger diameter sleeve member 25. The arm portion 27 of the support member could also be one and a half inch pipe approximately two feet long. It could be welded to the pipe 26 at 28. In the alternative, the cylindrical portion 26 and the arm member 27 could all be formed of a single five foot length of one and a half inch pipe bent at 28 to provide the angle A necessary for the arm portion 27. Although the exact angle between the arm portion 27 and the cylindrical portion 26 is not critical, an obtuse angle is preferred and an angle of one hundred twenty-five degrees would not be unreasonable.

Connected to the distal end of the arm member 27 is an attachment member 29. As illustrated, the attachment member is a chain of several links. The number of links is not critical either. One end of the attachment 29 is affixed to the arm 27 and the free end thereof could be engaged by straps, such as the straps 30 shown in FIG. 1, which encircle the cables 10 and the hoses 11 to support the cables 10 and hoses 11 from the arm 27 of the support apparatus 20. When so connected, the tractor 1 and the trailer 2 can pivot relative to each other about the pivot 5. As this occurs, the arm 27 is allowed to pivot about the axis of the cylindrical portion 26 within the tubular member 25 to support the cables 10 and hoses 11 and to prevent them from rubbing or chaffing against any portion of the tractor 1 or the trailer 2.

Thus, the support apparatus of the present invention provides a relatively simple means of supporting the cable, hose and the like which provide power and/or fluid communication between a tractor and trailer of a tractor-trailer rig. The support apparatus is relatively simple, inexpensive and easy to install. It can be sized and adapted to almost any tractor-trailer rig combination. Most importantly, it reduces maintenance cost and rig down time. A single preferred embodiment of the invention has been described herein. However, many variations thereof may be made without departing from the spirit of the invention. Accordingly, it is intended that the scope of the invention be limited only by the claims which follow.

What is claimed is:

1. Apparatus for supporting cable, hose and the like which provides power and fluid communication between a tractor and trailer of a tractor-trailer rig, said apparatus comprising:

a base member attachable to the frame of said tractor;

a tubular sleeve member affixed to said base member and extending vertically upward therefrom;

a support member having an elongated cylindrical portion insertable into said sleeve member for free rotation therein and from an upper end of which extends, at an obtuse angle therewith, an arm portion which pivots about the axis of said cylindrical portion as said cylindrical portion freely rotates within said sleeve member; and an attachment member connected to the distal end of said arm portion for attachment to one or more of said cable, hose and the like.

2. Apparatus set forth in claim 1 in which said cylindrical portion of said support member is tubular and the outside diameter of which is slightly less than the inside diameter of said tubular sleeve member.

3. Apparatus as set forth in claim 2 in which the length of said cylindrical portion of said support member is greater than the length of said sleeve member.

4. Apparatus as set forth in claim 1 in which the length of said cylindrical portion of said support member is greater than the length of said sleeve member and the length of said arm portion is less than the length of said cylindrical portion.

5. Apparatus as set forth in claim 1 in which said base member comprises a short length of channel steel to which is welded the lower end of said tubular sleeve member which is also made of steel.

6. Apparatus as set forth in claim 1 in which said sleeve member is made of steel pipe and said support member is made of smaller diameter pipe which is bent to provide said arm portion thereof.

7. Apparatus as set forth in claim 6 in which said attachment member comprises a plurality of chain links one of which is affixed to said distal end of said arm member.

\* \* \* \* \*